US008059367B2

(12) United States Patent
Lee et al.

(10) Patent No.: US 8,059,367 B2
(45) Date of Patent: Nov. 15, 2011

(54) METHODS FOR CREATING A MAGNETIC MAIN POLE WITH SIDE SHIELD AND SYSTEMS THEREOF

(75) Inventors: Edward Hin Pong Lee, San Jose, CA (US); Aron Pentek, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 450 days.

(21) Appl. No.: 12/341,925

(22) Filed: Dec. 22, 2008

(65) Prior Publication Data

US 2010/0159282 A1 Jun. 24, 2010

(51) Int. Cl.
*G11B 5/127* (2006.01)
(52) U.S. Cl. .......... 360/125.3; 360/119.02; 360/119.04; 360/125.03
(58) Field of Classification Search ............... 360/125.3, 360/119.02, 119.04, 125.03, 125.06
See application file for complete search history.

(56) References Cited

U.S. PATENT DOCUMENTS

| 5,075,956 | A | * | 12/1991 | Das | 29/603.14 |
| 5,943,763 | A | | 8/1999 | Shouji et al. | 29/603.14 |
| 7,227,720 | B2 | * | 6/2007 | Sasaki et al. | 360/125.12 |
| 7,599,154 | B2 | * | 10/2009 | Sbiaa et al. | 360/324.11 |
| 2005/0259355 | A1 | | 11/2005 | Gao et al. | 360/125 |
| 2007/0177301 | A1 | | 8/2007 | Han et al. | 360/126 |
| 2008/0297945 | A1 | * | 12/2008 | Han et al. | 360/125.3 |

* cited by examiner

*Primary Examiner* — Tan T. Nguyen
(74) *Attorney, Agent, or Firm* — Zilka-Kotab, PC

(57) ABSTRACT

A method according to another embodiment includes forming a side shield layer of ferromagnetic material above a substrate; masking the side shield layer; milling an unmasked region of the side shield layer for forming a pole trench therein; and forming a pole layer in the pole trench. A structure according to one embodiment includes a substrate; a side shield layer of ferromagnetic material on the substrate, wherein the substrate has a region covered by the side shield layer and a region not covered by the side shield layer; a pole trench in the side shield layer and the region of the substrate not covered by the side shield layer; a layer of nonmagnetic material in the pole trench; and a pole layer in the pole trench, wherein the pole layer has a greater thickness above the region of the substrate not covered by the side shield layer than above the region of the substrate covered by the side shield layer.

21 Claims, 9 Drawing Sheets

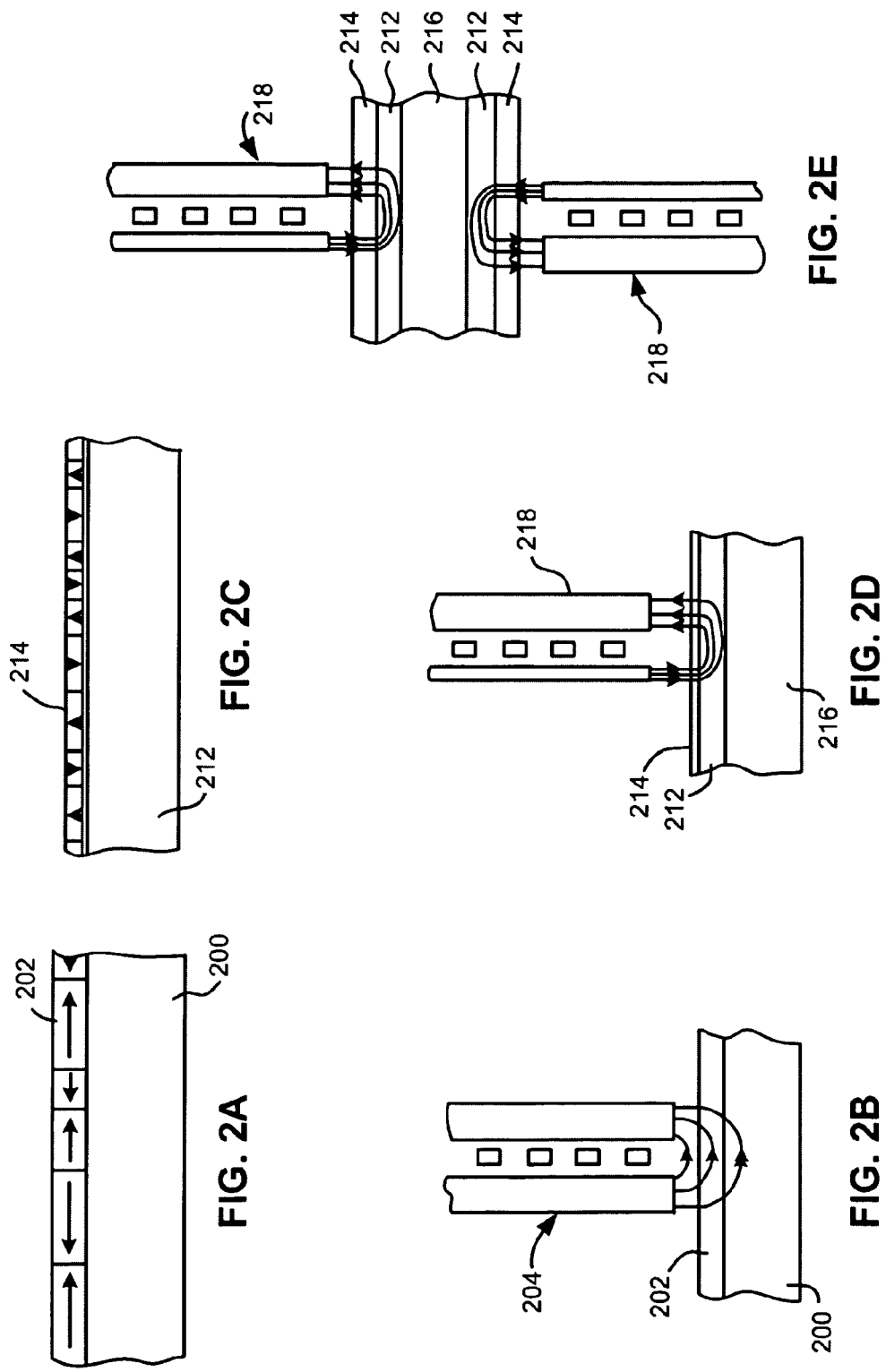

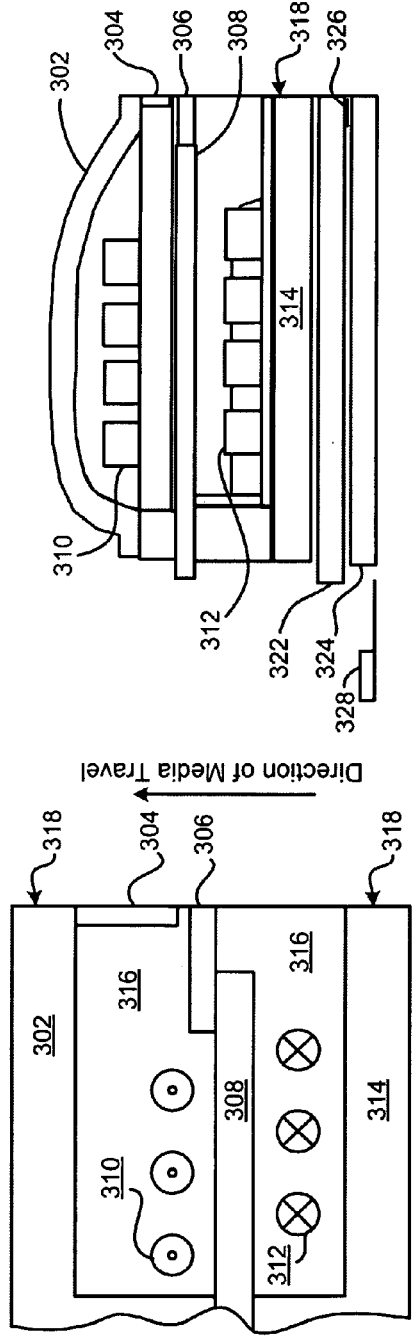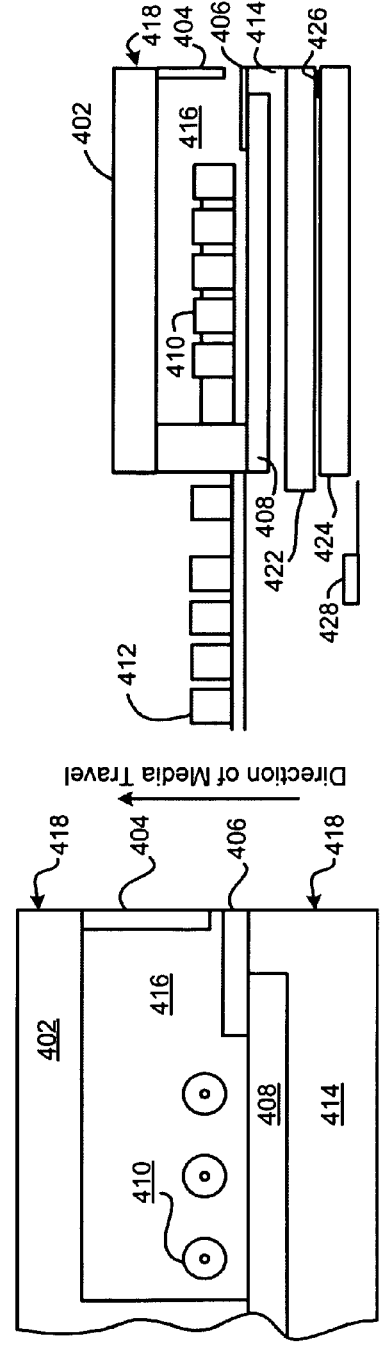

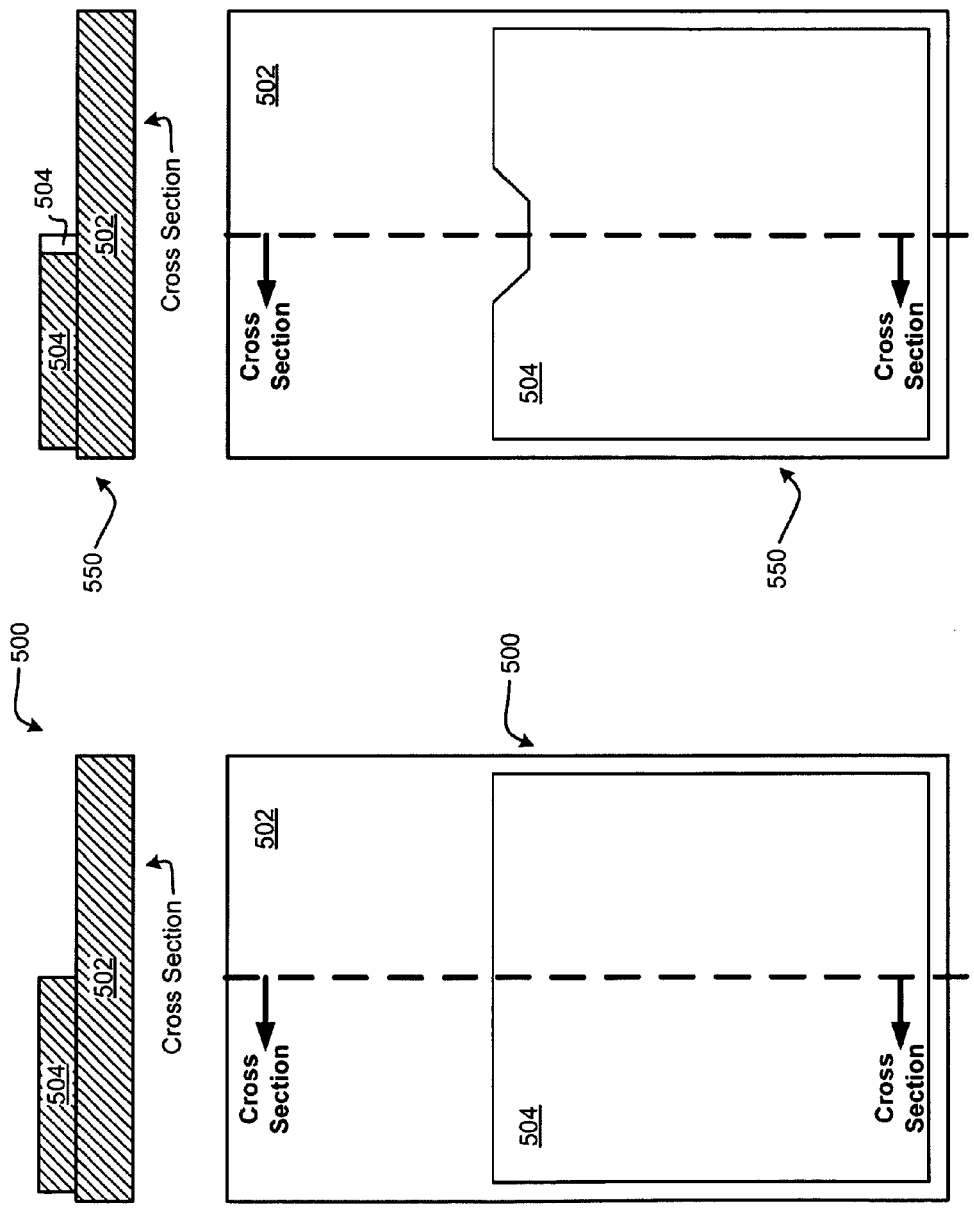

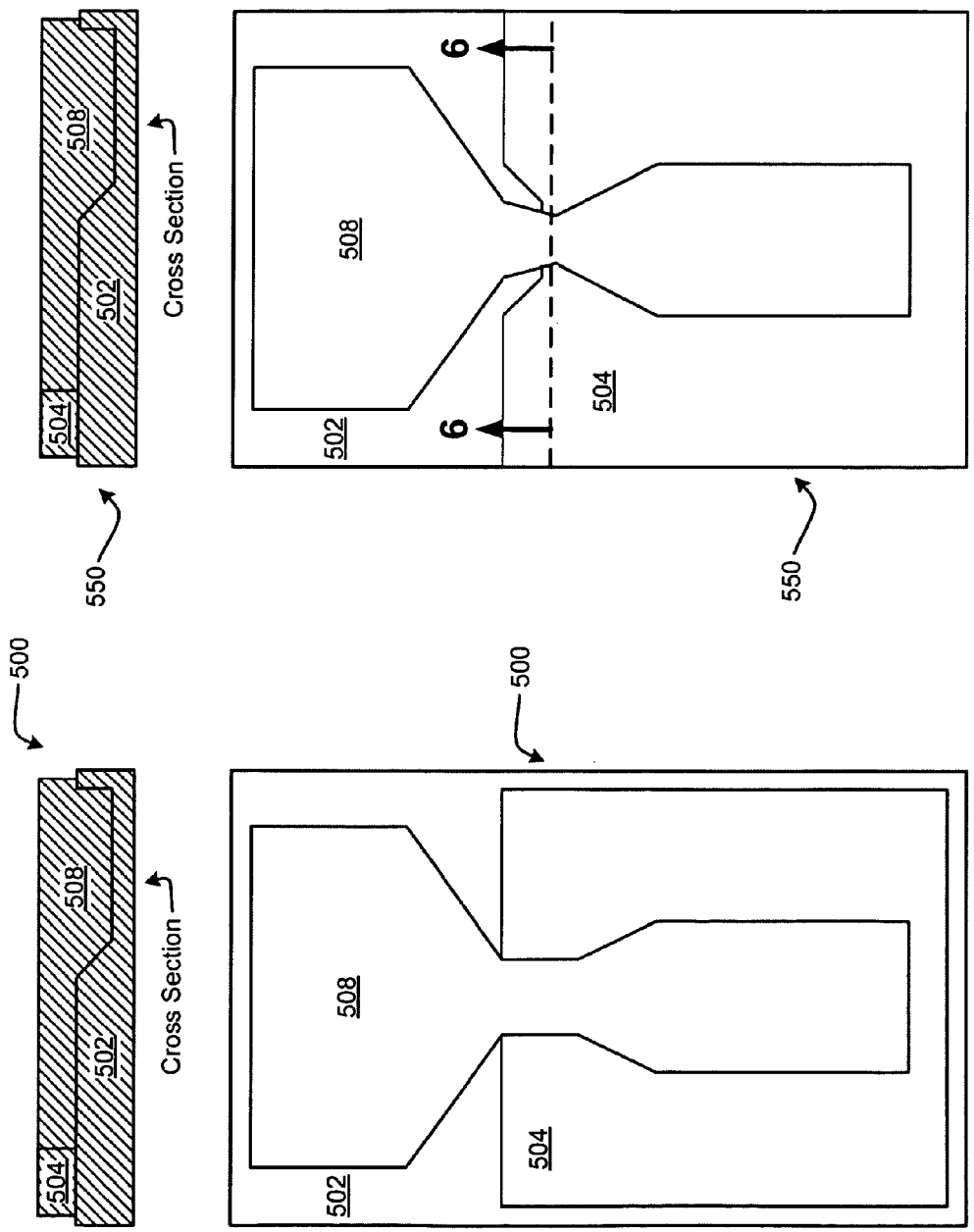

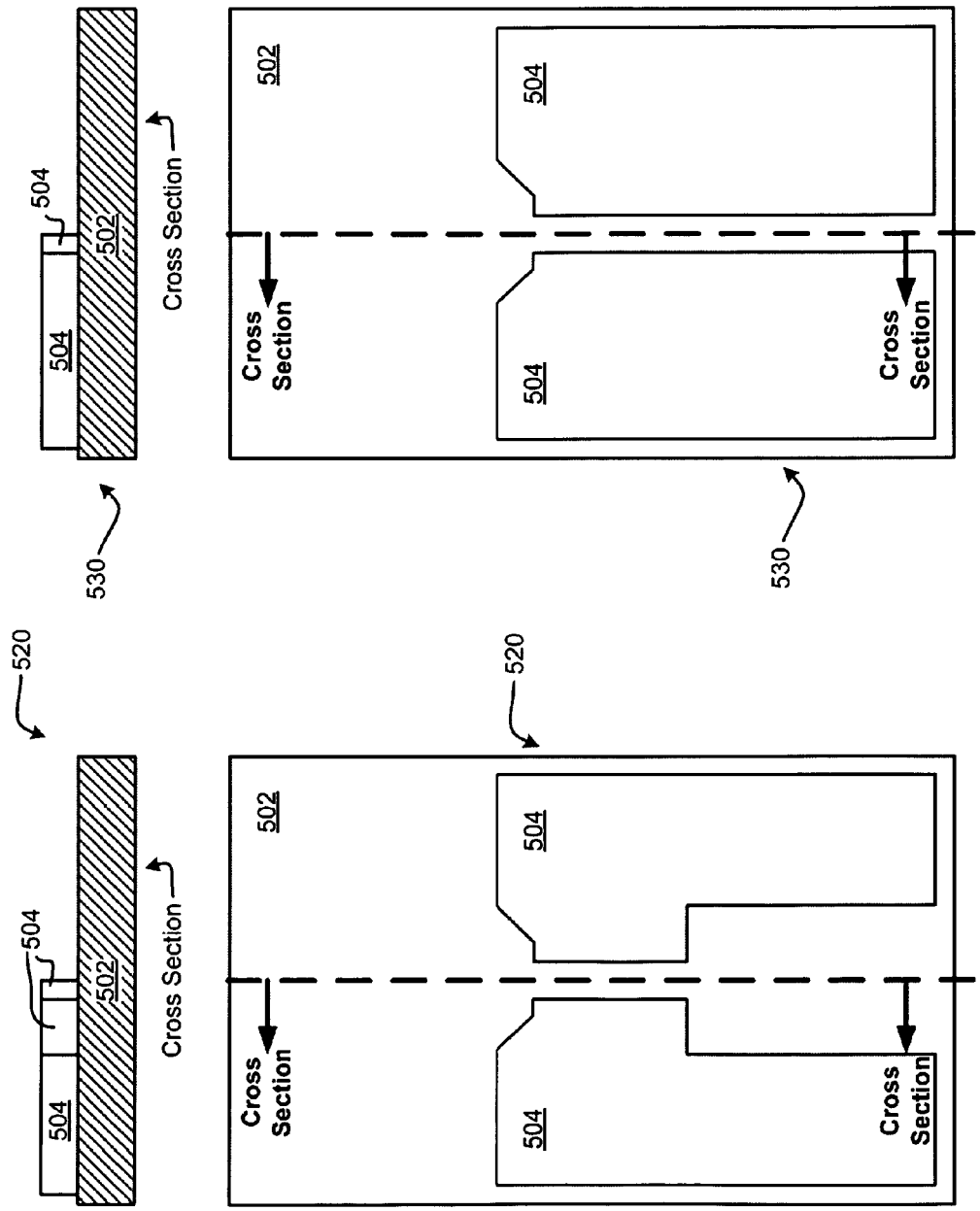

METHODS FOR CREATING A MAGNETIC MAIN POLE WITH SIDE SHIELD AND SYSTEMS THEREOF

FIELD OF THE INVENTION

The present invention relates to data storage systems, and more particularly, this invention relates to perpendicular recording heads used for storage of data.

BACKGROUND OF THE INVENTION

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

There are two conventional methods for forming the main pole of a magnetic head. The first conventional method uses an ion milling process to form the main pole from a full film layer. This conventional method does allow for the formation of the wrap around shield, but it becomes difficult to maintain the integrity of the pole shape for narrow pole widths. The second conventional method includes forming a trench in the shape of the desired main pole into a non-magnetic material, which is then filled with plated magnetic material. The plated magnetic material is then planarized to form the main pole. This conventional method does not have the pole shape integrity problem mentioned above, but it cannot form the wrap around shield easily.

Therefore, a method of forming a main pole with a side shield or wrap around shield that does not have the problems associated with conventional formation methods such as bending of the main pole would be advantageous.

SUMMARY OF THE INVENTION

A method according to one embodiment includes forming a side shield layer of ferromagnetic material on a substrate such that the substrate has a region covered by the side shield layer and a region not covered by the side shield layer; masking the side shield layer and the uncovered region of the substrate; forming a pole trench in an unmasked region of the side shield layer and an unmasked region of the substrate; forming a layer of nonmagnetic material in the pole trench; forming a pole layer in the pole trench above the layer of nonmagnetic material and the substrate; and planarizing the pole layer, wherein the pole layer has a greater thickness above the region of the substrate not covered by the side shield layer than above the region of the substrate covered by the side shield layer.

A method according to another embodiment includes forming a side shield layer of ferromagnetic material above a substrate; masking the side shield layer; milling an unmasked region of the side shield layer for forming a pole trench therein; and forming a pole layer in the pole trench.

A structure according to one embodiment includes a substrate; a side shield layer of ferromagnetic material on the substrate, wherein the substrate has a region covered by the side shield layer and a region not covered by the side shield layer; a pole trench in the side shield layer and the region of the substrate not covered by the side shield layer; a layer of nonmagnetic material in the pole trench; and a pole layer in the pole trench, wherein the pole layer has a greater thickness above the region of the substrate not covered by the side shield layer than above the region of the substrate covered by the side shield layer.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

FIGS. 5A-5H show structures which may be formed through a method according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a method comprises forming a side shield layer of ferromagnetic material on a substrate such that the substrate has a region covered by the side shield layer and a region not covered by the side shield layer; masking the side shield layer and the uncovered region of the substrate; forming a pole trench in an unmasked region of the side shield layer and an unmasked region of the substrate; forming a layer of nonmagnetic material in the pole trench; forming a pole layer in the pole trench above the layer of nonmagnetic material and the substrate; and planarizing the pole layer, wherein the pole layer has a greater thickness above the region of the substrate not covered by the side shield layer than above the region of the substrate covered by the side shield layer.

In another general embodiment, a method comprises forming a side shield layer of ferromagnetic material above a substrate; masking the side shield layer; milling an unmasked region of the side shield layer for forming a pole trench therein; and forming a pole layer in the pole trench.

In yet another general embodiment, a structure comprises a substrate; a side shield layer of ferromagnetic material on the substrate, wherein the substrate has a region covered by the side shield layer and a region not covered by the side shield layer; a pole trench in the side shield layer and the region of the substrate not covered by the side shield layer; a layer of nonmagnetic material in the pole trench; and a pole layer in the pole trench, wherein the pole layer has a greater thickness above the region of the substrate not covered by the side shield layer than above the region of the substrate covered by the side shield layer.

Figure 1:
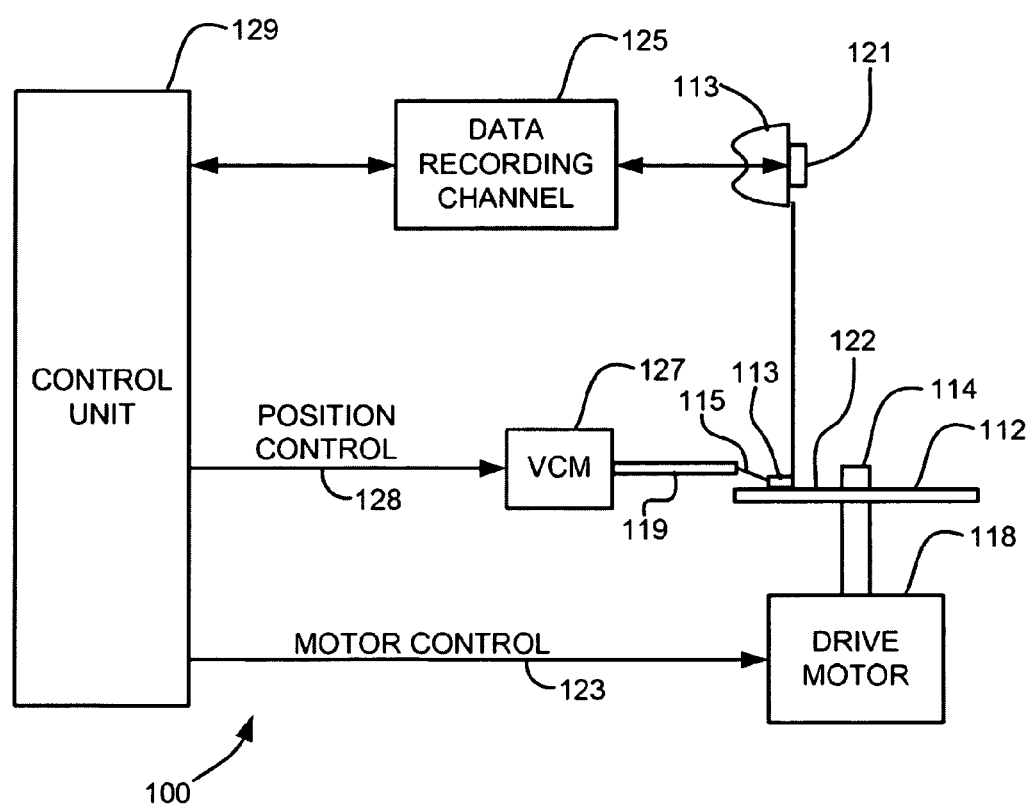
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals, generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a helical coil 410, which wraps around to form helical coil 412. Also, sensor shields 422, 424 are shown. The sensor 426 is typically positioned between the sensor shields 422, 424.

In FIGS. 3B and 4B, an optional heater 328, 428, respectively, is shown near the non-ABS side of the magnetic head. A heater 328, 428 may also be included in the magnetic heads shown in FIGS. 3A and 4A. The position of this heater may vary based on design parameters such as where the protrusion is desired, coefficients of thermal expansion of the surrounding layers, etc.

With the aid of FIGS. 5A-5H, illustrative main pole structures and methods of forming structures can be described. Presentation of such illustrative embodiments is done by way of example only and should not be construed as limiting.

In FIG. 5A, a top down view (lower view of structure 500) and a cross section (upper view of structure 500) are shown according to one embodiment. The cross section is taken from the dashed line in the top down view indicating Cross Section. Structure 500 in FIG. 5A is comprised of two layers, a substrate 502 and a side shield layer 504. The substrate 502 may be comprised of many layers of materials to form a partial magnetic write head. The surface of the substrate 502 may be a dielectric material such as alumina.

The side shield layer 504 may be comprised of any magnetic material, including NiFe, CoNiFe, etc. In some preferred embodiments, the side shield layer 504 may be a ferromagnetic material, and may be formed by plating, sputtering, or any other technique as would be known by one of reasonable skill in the relevant art. In one preferred embodiment, the side shield material 504 may be 45/55 NiFe. In some embodiments, the substrate 502 may have a region that is covered by the side shield layer 504, and a region which is not covered by the side shield layer 504.

Structure 500 is comprised of a side shield layer 504 that has substantially straight edges all around. In FIG. 5B, another embodiment is shown where the side shield layer 504 may have another shape. In FIG. 5B, a top down view (lower view of structure 550) and a cross section (upper view of structure 550) are shown according to one embodiment. For example, the side shield layer 504 may be formed such that there is a "notch" where the substrate 502 may be exposed at the upper portion of the side shield layer 504. The positioning of this notch may determine, through subsequent processing steps, the location of the "step" for a main pole. A stepped main pole has a thinner portion, with a step located somewhere along its length, generally at or near a flare point where the main pole substantially increases in size. By adjusting the location of this notch, the location where the step will be formed may also be adjusted, thus allowing the location of the step to be controlled more accurately.

In some embodiments, the side shield layer 504 may be formed by masking a portion of the substrate 502, then depositing the magnetic material. In some embodiments, there may be additional layers above this side shield layer 504, such as a carbon layer, a hard mask layer, a nonreactive layer, etc. In addition, combinations of these layers and others may be formed above the side shield layer 504. In one preferred embodiment, a carbon layer, a hard mask layer, and a carbon layer may be formed above the side shield layer 504.

From the cross section of structures 500 and 550, it can be seen that the side shield layer 504 may be above a portion of the substrate 502. In some embodiments, the side shield layer 504 may be formed above substantially all of the substrate 502.

Figures 5C, 5D:
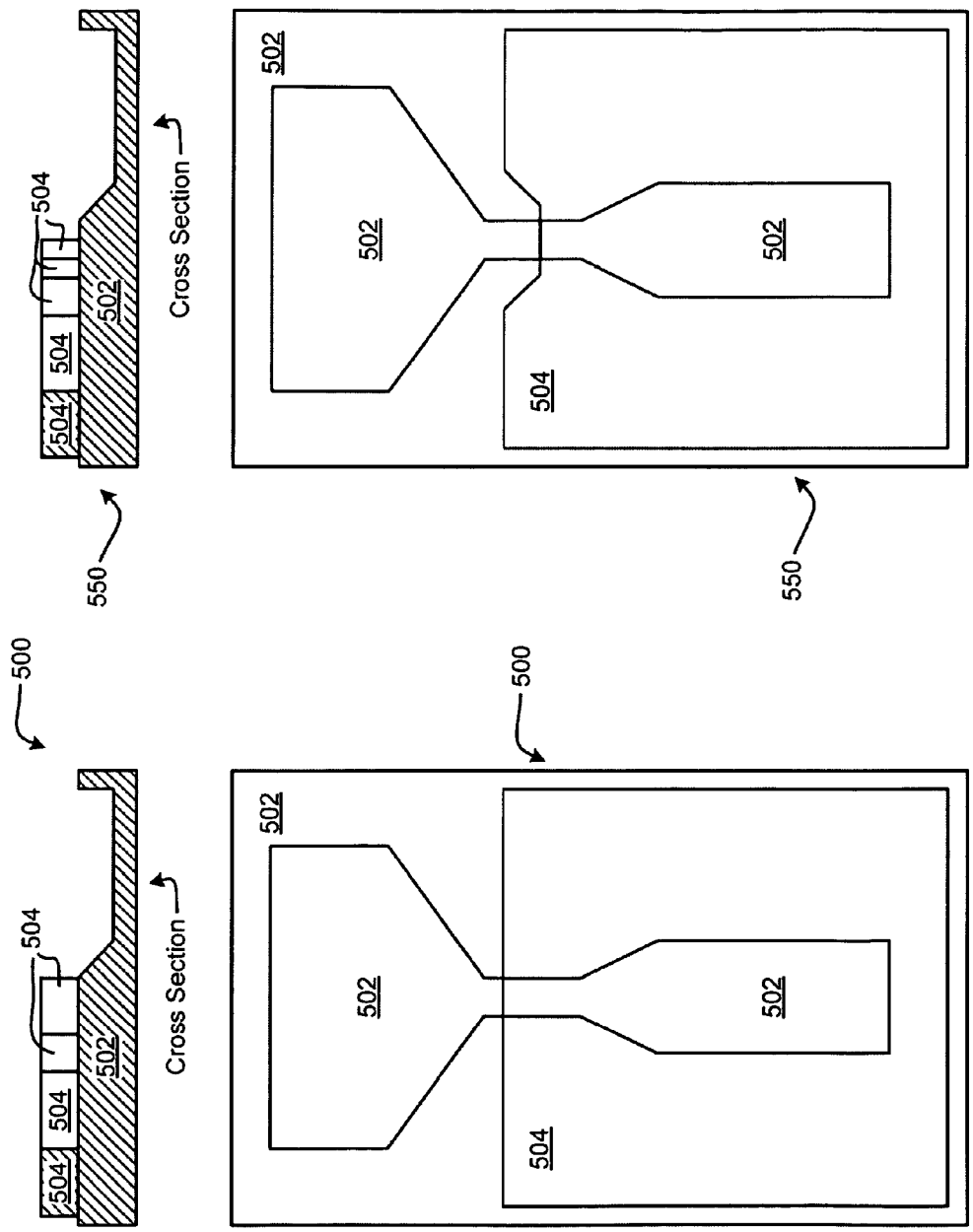

Now referring to FIG. 5C, a structure 500 is shown according to one embodiment. In FIG. 5C, a top down view (lower view of structure 500) and a cross section (upper view of structure 500) are shown. In some embodiments, material may be removed from the structure 500 shown in FIG. 5A to form the structure 500 shown in FIG. 5C. Any technique as would be known by one of reasonable skill in the relevant art to remove material from the structure 500 in FIG. 5A may be used to form the shape shown in FIG. 5C. The shape is generally the form of a main pole that may be used in a magnetic head after processing is completed, and may be described as an "hourglass." In some embodiments, a photoresist layer may be formed above structure 500 in FIG. 5A, leaving the hourglass shape exposed, so that a milling operation may be performed to form the structure 500 as shown in FIG. 5C.

As can be seen from the cross section in FIG. 5C, the substrate 502 may have material removed from the right portion, which corresponds to the upper portion in the top down view. In some embodiments, the substrate 502 may be removed at an angle such that a "step" is formed between the two levels.

In some preferred embodiments, a pole "trench" may be formed in an unmasked region of the side shield layer 504 and an unmasked region of the substrate 502. This trench will be further described in FIGS. 6A-6I.

In some embodiments, material may be removed from the substrate 502 and side shield layer 504 to form the structures 500, 550 shown in FIGS. 5C-5D through any technique as would be known by one of reasonable skill in the relevant art. In some preferred embodiments, in which there may be a carbon/hard mask/carbon layer formed above the side shield layer 504 and substrate 502, reactive ion etching (RIE) and milling may be used to remove material.

For example, in embodiments having a structure comprising layers of substrate/magnetic layer/carbon layer/hard mask layer/carbon layer structure, a mask layer may be formed above the structure, exposing only the surfaces where material is to be removed. RIE may be used to remove portions of the top carbon layer left exposed by the mask layer, milling may be used to remove portions of the hard mask layer left exposed by the mask layer, another RIE process may be used to remove the middle carbon layer left exposed by the mask layer, and a trench may be milled into the side shield layer 504 and substrate 502.

The trench that may be formed into the side shield layer 504 and substrate 502 may generally define the main pole tip in subsequent processing operations. In some preferred embodiments, atomic layer deposition (ALD) of alumina may be used to further define the trench formed in the substrate 502 and side shield layer 504, which may affect trackwidth of the finished structure once the pole layer (as shown as 508 in FIG. 5E) is formed.

Now referring to FIG. 5D, a top down view (lower view of structure 550) and a cross section (upper view of structure 550) are shown according to one embodiment. In FIG. 5D, substantially the same processing as used in FIG. 5C may lead to a similar shape shown as structure 550, except for the existence of the notch near the upper portion of the side shield layer 504, which is unique to structure 550.

With reference to FIG. 5E, a top down view (lower view of structure 500) and a cross section (upper view of structure 500) are shown according to one embodiment. In FIG. 5E, a pole layer 508 may be formed in the hourglass shape, with additional material forming above the hourglass shape, such that the overall shape of the pole layer 508 may be larger than the hourglass shape formed in the structure 500. In some embodiments, a photoresist layer may be formed above the structure 500 leaving exposed the hourglass shape plus some additional space around all edges of the hourglass shape, thus allowing for the main pole 508 to be formed in the exposed area.

In some preferred embodiments, the pole layer 508 may be formed by depositing a magnetic material, such as NiFe, CoNiFe, Permalloy, etc., e.g., by plating, in the area left exposed by a mask layer or photoresist layer. However, another technique as would be known to one of reasonable skill in the relevant art may be used to form the main pole 508.

In a preferred embodiment, the pole layer 508 may have a flare point defined away from the side shield layer 504.

Now referring to FIG. 5F, a top down view (lower view of structure 550) and a cross section (upper view of structure 550) are shown according to one embodiment. In FIG. 5F, a structure 550 similar to structure 500 shown in FIG. 5E may be formed, except for the "pinched" area near the notch.

In some embodiments, a photoresist layer or mask layer may be formed above the structure 550 leaving exposed the larger hourglass shape shown as 508 in FIG. 5E or 5F. This exposed area may then be filled with a material, such as NiFe, CoNiFe, Permalloy, etc., to form the pole layer 508. The pole layer 508 may be formed in the area left exposed by the mask layer or photoresist layer, through any technique as would be known by one of reasonable skill in the relevant art, such as plating.

In some embodiments, a top shield layer (not shown) may be formed above the structures 500 or 550 as shown in FIGS. 5E and 5F, respectively. In addition, a layer of nonmagnetic and preferably insulative material may be formed between the top shield and the pole layer 508, wherein the top shield may be in electrical communication with the side shield layer 504.

In another preferred embodiment, a layer of nonmagnetic and preferably insulative material may be formed between the top shield, the pole layer 508, and the side shield layer 504.

Line 6 in FIG. 5F defines a cross section of the structure 550 according to one embodiment, which is the vantage point for the progressively-formed structures shown in FIGS. 6A-6I. Of course, the cross section shown in FIGS. 6A-6I could also be a cross section of other embodiments besides that shown in FIG. 5F, but many embodiments will have a cross section substantially similar to that shown in FIGS. 6A-6I.

Now referring to FIGS. 5G and 5H, starting structures 520 and 530 are shown according to some embodiments. These starting structures may be used alternatively to starting structures 500 and 550 shown in FIGS. 5A and 5B, respectively. In FIG. 5G, a top down view (lower view of structure 520) and a cross section (upper view of structure 520) are shown according to one embodiment. Structure 520 may have a preliminary trench formed through the central portion of the side shield layer 504, along with a larger area removed near the lower portion of the structure 520. This preliminary trench may help subsequent processing steps by corresponding to an area where a subsequent processing step would remove material to form the trench. This may help the processing proceed faster and with less chance of error by eliminating steps to remove the material, since it has already been removed prior to forming subsequent layers above the structure 520.

Similarly, as shown in FIG. 5H, a top down view (lower view of structure 530) and a cross section (upper view of structure 530) are shown according to one embodiment. A structure 530 may have a preliminary trench formed through a central portion of the side shield layer 504 where the trench will be formed in a subsequent step, thereby reducing subsequent processing steps and allowing a more efficient manufacturing process to form the structure.

These structures 520 and 530 may undergo to the same processing steps as described for structures 500 and 550, thereby resulting in a main pole with side shield or wrap around shield. Other starting structures are also possible, and the description of these two additional starting structures is not meant to limit the scope of the invention in any manner.

Now referring to FIGS. 6A-6I, a cross section of structure 550 according to one embodiment is shown, taken from Line 6 in FIG. 5F. FIGS. 6A-6I show more detail of each of the processing steps which may be used to create a main pole with side shield or wrap around shield.

Figure 6A:
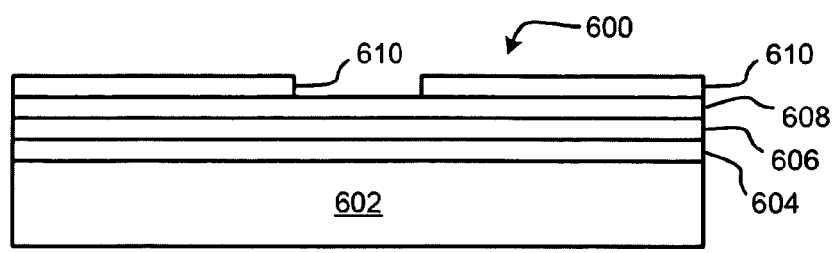
FIGS. 6A-6I show structures which may be formed through a method according to one embodiment.

In FIG. 6A, a structure 600 is shown which may be comprised of one or more layers. In one embodiment, a side shield layer 602 may be formed, possibly above another layer, such as a substrate (not shown). The side shield layer 602 may be formed of any material as would be known by one of reasonable skill in the relevant art to act as a side shield in a magnetic head. Above the side shield layer 602, a carbon layer 604, a hard mask layer 606 such as Cr, and a carbon layer 608 may be formed through any process as would be known by one of reasonable skill in the relevant art, such as sputtering. A photoresist layer 610 may be formed above the carbon layer 608, such that a gap is left exposed in the central portion of the carbon layer 608, where a trench may subsequently be formed.

Figure 6B:
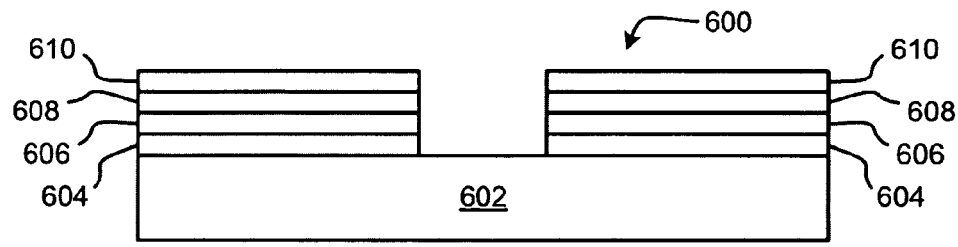

Now referring to FIG. 6B, according to one embodiment, portions of the three layers exposed below the photoresist layer 610 may be removed through any process as would be known by one of reasonable skill in the relevant art, such as milling, etching, etc. In one preferred embodiment, the carbon layers 608, 604 may be removed through RIE, and the hard mask layer 606 may be removed through milling. The result of this processing is to expose a portion of the side shield layer 602.

Figure 6C:
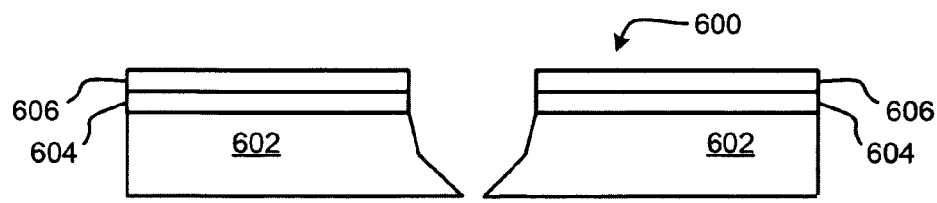

In FIG. 6C, another processing operation according to one embodiment is shown where a portion of the side shield layer 602 may be removed forming a "trench" therein. As can be seen, the edges of the trench may be angled, and the angles may be determined by the process used to remove the side shield material. In some embodiments, the side shield layer 602 may be removed through RIE.

In a preferred embodiment, the trench may be formed in the side shield layer 602 through milling, but any technique as would be known by one of reasonable skill in the relevant art may be used to form the trench. In addition, the trench may have sidewalls characterized as having an angled or concave shape resulting from milling. As is well known in the art, milling may impart a characteristic shape on a sidewall formed by milling.

Figure 6D:
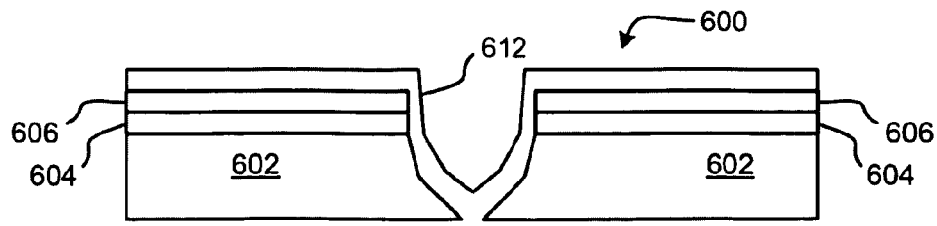

Now referring to FIG. 6D, a nonmagnetic layer 612 may be formed above the structure 600. In some preferred embodiments, the nonmagnetic layer 612 may be formed of a nonmagnetic and preferably electrically insulative material, such as alumina. This nonmagnetic layer 612 may be formed in the trench only, or formed full film as shown in FIG. 6D. In a preferred embodiment, ALD alumina may be used. However, any suitable materials and processes as would be known by one of reasonable skill in the relevant art may be used to form the nonmagnetic layer 612.

Figure 6E:
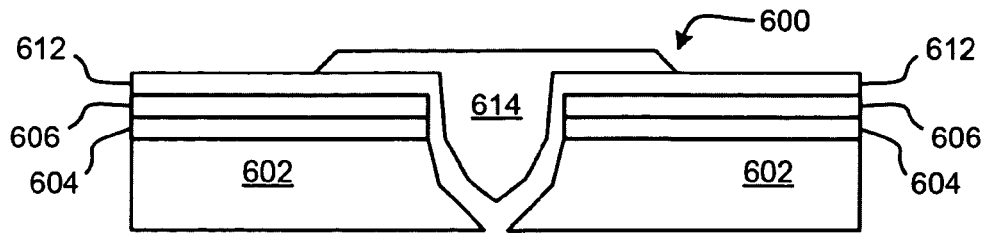

In FIG. 6E, a pole layer 614 may be formed above the structure 600, generally inside of the trench and above the nonmagnetic layer 612, according to one embodiment. In a preferred embodiment, the pole layer 614 may be formed through plating. Also, in some embodiments, the pole layer 614 may be formed of 45/55 NiFe, but any suitable technique and material may be used as would be known by one of reasonable skill in the relevant art.

Figure 6F:
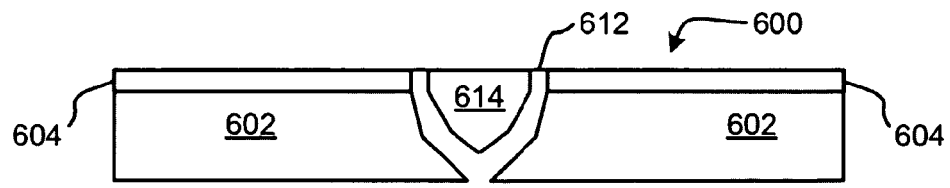

In FIG. 6F, the structure 600 is shown after a processing step, such as CMP (chemical and mechanical polishing), to expose the carbon layer 604. In this embodiment, the pole layer 614 may have a greater thickness above the region of the substrate (not shown) not covered by the side shield layer 602 than above the region of the substrate covered by the side shield layer 602. Any technique may be used to planarize the structure 600 as would be known by one of reasonable skill in the relevant art. This step also reveals a smooth, continuous upper surface such that subsequent processing may be performed to the structure 600.

Figure 6G:
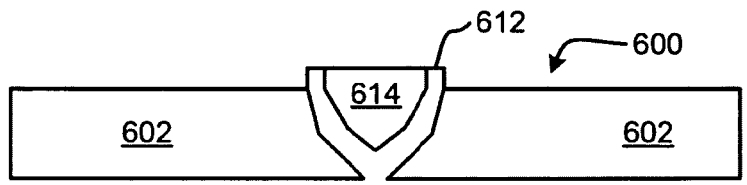

In FIG. 6G, the structure 600 is shown after a processing step, such as RIE in preferred embodiments, is performed to remove the carbon layer 604. This exposes the upper surfaces of the side shield layer 602.

Figure 6H:
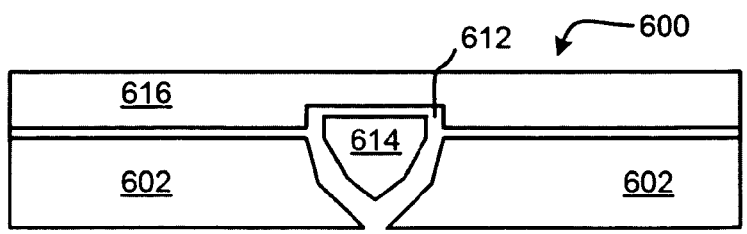
Figure 6I:
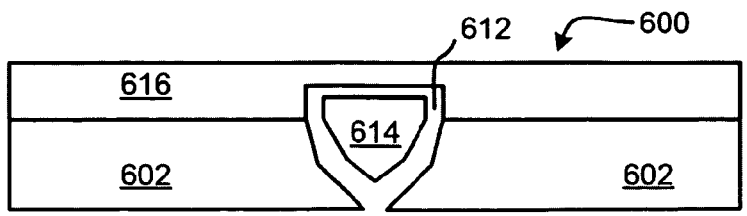

FIGS. 6H and 6I show alternate final steps of forming the structure 600 so that it may be used as a main pole with side shield. In FIG. 6H, additional material, such as alumina or some other insulating material, may be deposited above the side shield layer 602, thus forming a layer between the side shield 602 and a subsequently formed top shield 616. In FIG. 6I, additional material, such as alumina or some other insulating material, is formed above the pole layer 614 but not above the side shield layer 602, thus resulting in substantial contact between the top shield 616 and the side shield layer 602. Either formation may be referred to as a wrap around shield.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   forming a side shield layer of ferromagnetic material on a substrate such that the substrate has a region covered by the side shield layer and a region not covered by the side shield layer;
   masking the side shield layer and the uncovered region of the substrate;
   forming a pole trench in an unmasked region of the side shield layer and an unmasked region of the substrate;
   forming a layer of nonmagnetic material in the pole trench;
   forming a pole layer in the pole trench above the layer of nonmagnetic material and the substrate; and
   planarizing the pole layer, wherein the pole layer has a greater thickness above the region of the substrate not covered by the side shield layer than above the region of the substrate covered by the side shield layer.

2. A method as recited in claim 1, wherein the pole trench is formed in the side shield layer by milling.

3. A method as recited in claim 1, wherein the pole layer is formed by plating.

4. A method as recited in claim 1, wherein the pole layer has a flare point defined away from the side shield layer.

5. A method as recited in claim 1, wherein the side shield layer is formed with a preliminary trench therein at a location of where the pole trench is formed in a subsequent step.

6. A method as recited in claim 1, further comprising forming a top shield above the pole layer.

7. A method as recited in claim 6, further comprising forming a layer of nonmagnetic material between the top shield and the pole layer, wherein the top shield is in electrical communication with the side shield layer.

8. A method as recited in claim 6, further comprising forming a layer of nonmagnetic material between the top shield and the pole and side shield layers.

9. A method, comprising:
   forming a side shield layer of ferromagnetic material above a substrate;
   masking the side shield layer;
   milling an unmasked region of the side shield layer for forming a pole trench therein; and
   forming a pole layer in the pole trench,
   wherein the side shield layer is formed with a preliminary trench therein at a location of where the pole trench is formed in a subsequent step.

10. A method as recited in claim 9, wherein the pole layer is formed by plating.

11. A method as recited in claim 9, wherein the pole layer has a flare point defined away from the side shield layer.

12. A method as recited in claim 9, further comprising forming a top shield above the pole layer.

13. A method as recited in claim 12, further comprising forming a layer of nonmagnetic material between the top shield and the pole layer.

14. A method as recited in claim 13, wherein the top shield is in electrical communication with the side shield layer.

15. A method as recited in claim 9, wherein the pole layer has a greater thickness in the unmasked region of the substrate than in the unmasked region of the side shield layer.

16. A method, comprising:
    forming a side shield layer of ferromagnetic material above a substrate;
    masking the side shield layer;
    milling an unmasked region of the side shield layer for forming a pole trench therein;
    forming a pole layer in the pole trench, and
    milling the substrate for forming a pole trench therein, and forming the pole layer in the pole trench of the substrate.

17. A method as recited in claim 16, further comprising planarizing the pole layer, wherein the pole layer has a greater thickness above the pole trench of the substrate than above the pole trench of the side shield layer.

18. A structure, comprising:
    a substrate;
    a side shield layer of ferromagnetic material on the substrate, wherein the substrate has a region covered by the side shield layer and a region not covered by the side shield layer;
    a pole trench in the side shield layer and the region of the substrate not covered by the side shield layer;
    a layer of nonmagnetic material in the pole trench; and
    a pole layer in the pole trench, wherein the pole layer has a greater thickness above the region of the substrate not covered by the side shield layer than above the region of the substrate covered by the side shield layer.

19. A structure as recited in claim 18, wherein the pole trench has sidewalls characterized as having an angled or concave shape resulting from milling.

20. A structure as recited in claim 18, further comprising a top shield above the pole layer.

21. A structure as recited in claim 20, further comprising forming a layer of nonmagnetic material between the top shield and the pole layer.

* * * * *